United States Patent
Li et al.

(10) Patent No.: US 12,356,305 B2
(45) Date of Patent: Jul. 8, 2025

(54) RELIABLE AND AUTOMATIC ON-BOARD UNIT FOR VEHICLES IN DISTRESS, MOVABLE DEVICE, AND METHOD OF CONTROLLING SAME

(71) Applicant: Shenzhen Fulian Fugui Precision Industry Co., Ltd., Shenzhen (CN)

(72) Inventors: Feng-Yuan Li, Nanning (CN); Zhi-Cheng Yu, Shenzhen (CN); Xiao-Min Liang, Nanning (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 374 days.

(21) Appl. No.: 18/106,451

(22) Filed: Feb. 6, 2023

(65) Prior Publication Data
US 2023/0300590 A1    Sep. 21, 2023

(30) Foreign Application Priority Data
Feb. 25, 2022   (CN) .......................... 202210176567.9

(51) Int. Cl.
H04W 4/90      (2018.01)
H04W 4/40      (2018.01)
H04W 8/20      (2009.01)
B60R 21/013    (2006.01)

(52) U.S. Cl.
CPC ............... *H04W 4/90* (2018.02); *H04W 8/20* (2013.01); *B60R 21/013* (2013.01); *H04W 4/40* (2018.02)

(58) Field of Classification Search
CPC .................................. H04W 4/90; H04W 8/20
USPC ......................................................... 455/404.1
See application file for complete search history.

(56) References Cited

U.S. PATENT DOCUMENTS

| | | |
|---|---|---|
| 2018/0205399 A1 | 7/2018 | Baringer et al. |
| 2020/0374766 A1 | 11/2020 | Veloso et al. |
| 2021/0023985 A1 | 1/2021 | Stadnyk |
| 2023/0184870 A1* | 6/2023 | Shuman ............... G01S 5/0036 |
| | | 455/456.1 |
| 2023/0217545 A1* | 7/2023 | Liu ........................ H04W 4/90 |
| | | 455/404.1 |

* cited by examiner

*Primary Examiner* — Maria El-Zoobi
(74) *Attorney, Agent, or Firm* — ScienBiziP, P.C.

(57) ABSTRACT

A fail-safe on-board unit, a movable device, and a control method for a vehicle which will automatically and reliably broadcast a distress signal to a rescue center in the event of accident includes in the on-board unit a first subscriber identity module (SIM), a second SIM, a main processor, a modem, a radio frequency (RF) switch module, and an antenna module with several antennas. The main processor selects the first SIM and/or the second SIM to make a call to generate a baseband signal, and outputs the baseband signal to the modem, the modem converts the baseband signal into an RF signal, and outputs the RF signal to the RF switch module to transmit outward via one or more antennas of the antenna module. The on-board unit has a wider network coverage to ensure higher success rate of emergency calls.

17 Claims, 6 Drawing Sheets

RELIABLE AND AUTOMATIC ON-BOARD UNIT FOR VEHICLES IN DISTRESS, MOVABLE DEVICE, AND METHOD OF CONTROLLING SAME

FIELD

The present disclosure relates to the field of movable devices, in particular to an on-board unit, a movable device, and a control method.

BACKGROUND

With the rapid development of the automobile industry, automobile ownership continues to increase, there are more and more road accidents. The EU launched an on-board emergency call (E-call) system to send a distress signal in time. E-call system is an on-board technical system based on satellite positioning technology and mobile communication networks. After a vehicle accident, the E-call system communicates with the rescue center through the on-board unit (OBU) to send a distress signal. An existing on-board unit may use single card communication but if a crashed vehicle is in an area without signal coverage, a rescue will not happen. The external antenna in the existing OBU can be easily dislodged by an accident, which affects the communication between the OBU and the rescue center.

Therefore, improvement is desired.

SUMMARY OF THE DISCLOSURE

The embodiment of the present disclosure aims to provide an on-board unit, a movable device, and a control method to solve the above technical problems, the present disclosure has wider network coverage to ensure higher success rate for emergency calls.

The embodiment of the present disclosure provides an on-board unit, the on-board unit includes a first subscriber identity module (SIM), a second SIM, a main processor, a modem, a radio frequency (RF) switch module, and an antenna module. The first SIM and the second SIM are electrically connected to the main processor. The main processor is electrically connected to the modem. The main processor selects the first SIM and/or the second SIM to make a call to generate a baseband signal, and outputs the baseband signal to the modem, the modem converts the baseband signal into an RF signal, and outputs the RF signal to the RF switch module to be transmitted outward via the antenna module.

The embodiment of the present disclosure further provides a movable device, the movable device the on-board unit as described above.

The embodiment of the present disclosure further provides a control method, the control method can be applied to the on-board unit as described above. The method includes:
  detecting whether at least one antenna in an antenna module is in a normal and working state; and
  controlling a radio frequency (RF) switch module to select a first subscriber identity module (SIM) or a second SIM when emergency call function is triggered, so as to output a distress signal by using the antenna in the normal state.

The on-board unit of the present disclosure sets the first SIM and the second SIM to obtain a wider network coverage and improve the call success rate of the on-board unit.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

It should be noted that when an element is called "electrically connecting" another element, it can be directly on another component or there can be a centered element. When an element is said to be "electrically connected" to another element, it can be a contact connection, for example, a wire connection, or a non-contact connection, for example, a non-contact coupling.

The terms used in the description of the present disclosure herein are only for the purpose of describing specific embodiments and are not intended to limit the present disclosure. The term "and/or" as used herein includes any and all combinations of one or more related listed items.

Collisions between vehicles in accidents are more and more commonplace. The EU launched an on-board emergency call (E-call) system to send a distress signal in time. E-call system is an on-board technical system based on satellite positioning technology and mobile communication network. After a vehicle accident, the E-call system communicates with the rescue center through the on-board unit (OBU) to send a distress signal.

After a vehicle accident, the E-call system will automatically dial the emergency rescue telephone or other rescue center, transmit data to the rescue center in time, and help passengers establish voice contact with the rescue center.

Figure 1:
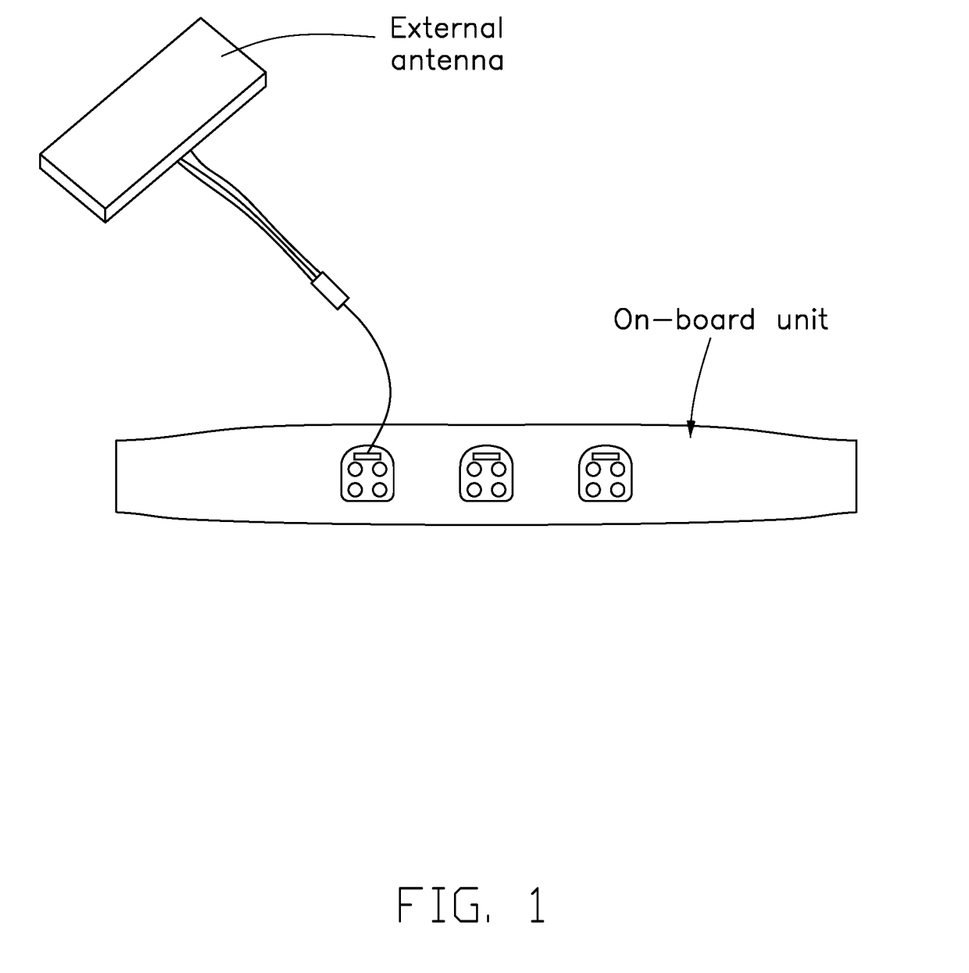
FIG. 1 is a schematic diagram of an on-board unit of prior art.

The conventional E-call system communicates with the rescue center through the on-board unit set in the vehicle. In order to better receive the signal, the onboard unit is usually installed in the center console area of the vehicle. The antenna in the on-board unit is led out to the best receiving position outside the shell of the on-board unit through a long RF cable (shown in FIG. 1). In a vehicle accident, the antenna may fall off or the connecting cable may be broken due to collision or body deformation, the on-board unit will not be able to establish call contact with the rescue center, which will lead to no rescue. The existing on-board unit may use single card communication, so if the distressed vehicle is in an area without signal coverage of the operator, it cannot be rescued when needed.

Figure 2:
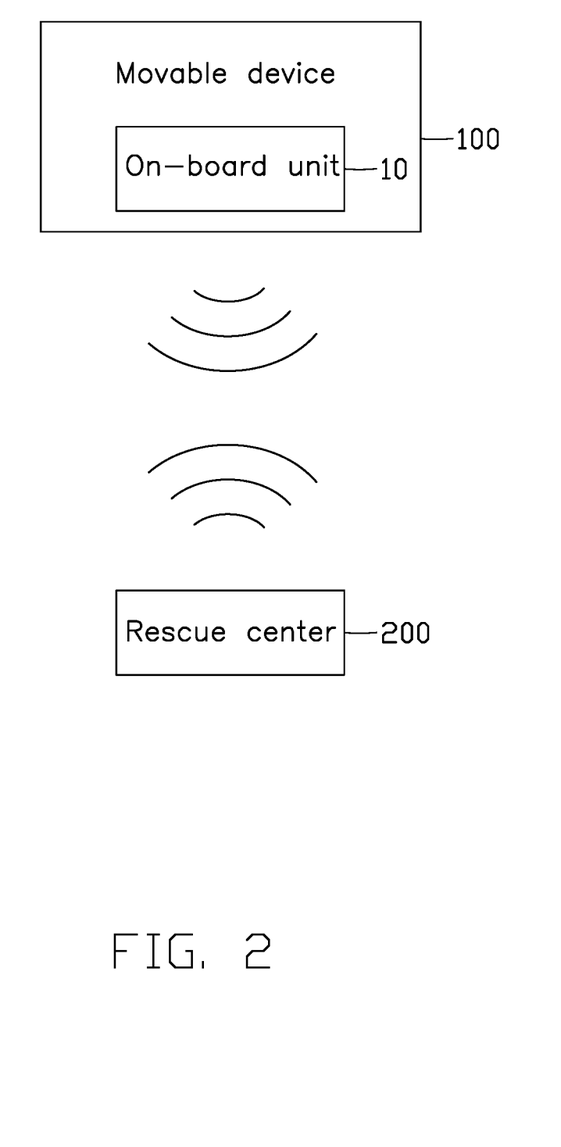
FIG. 2 is a schematic diagram of communication between a movable device equipped with an on-board unit and a rescue center according to an embodiment of the present disclosure.

FIG. 2 illustrates an on-board unit 10 in accordance with an embodiment of the present disclosure.

The on-board unit 10 can be applied to movable devices 100 such as smart cars, fuel vehicles, forklifts, mobile smart home devices, or mobile smart city devices, to solve at least one of the above problems. In one embodiment, the movable device 100 further includes a power module or a battery, the power module or the battery may be used to provide power for the on-board unit 10.

In the embodiment, taking the application of the on-board unit 10 to an intelligent vehicle as an example, the structure and specific working processes of the on-board unit 10 are described.

The on-board unit 10 can communicate with a rescue center 200 and send information of the movable device 100 to the rescue center 200 and conduct voice communication with the rescue center 200.

Figure 3:
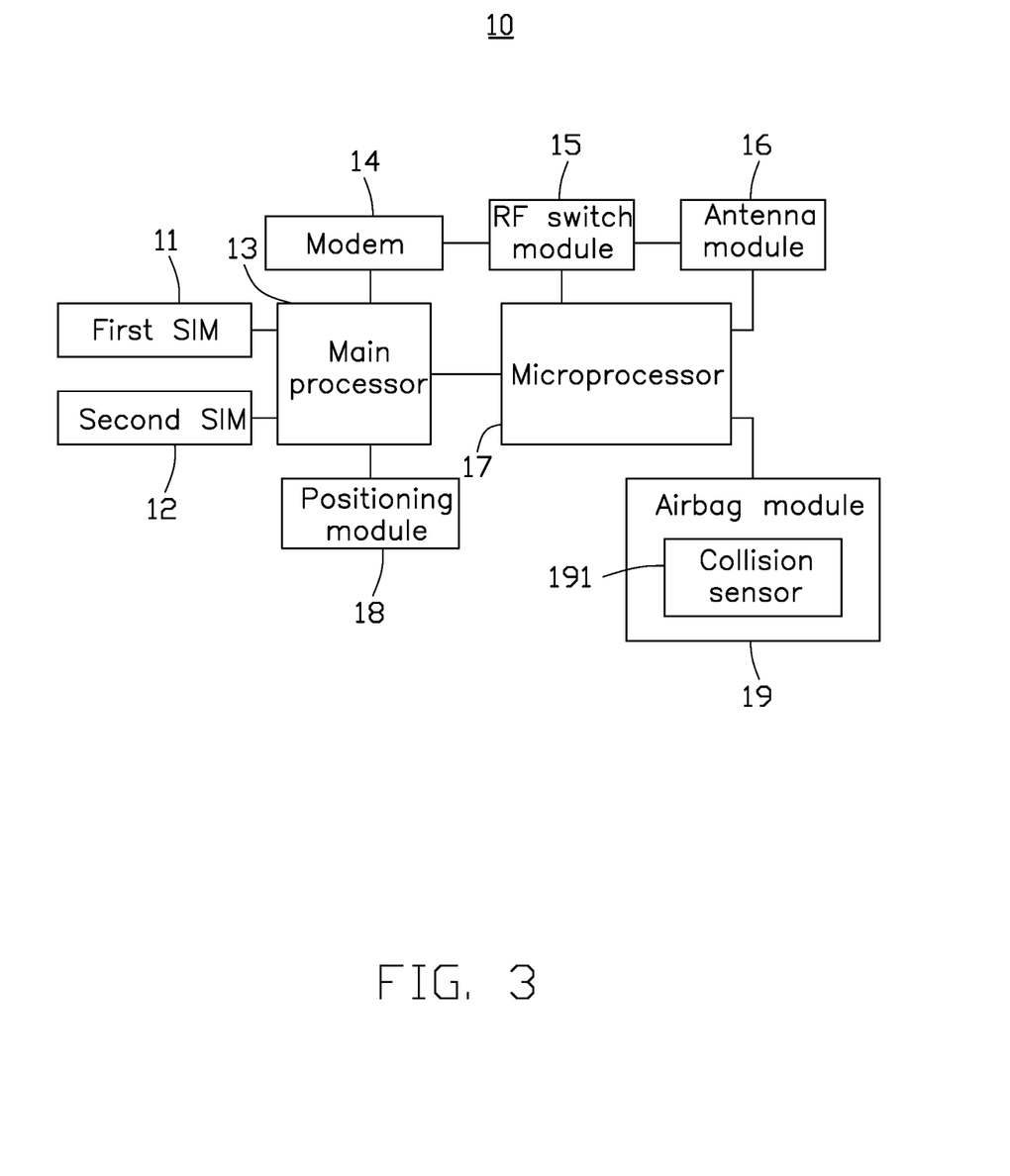
FIG. 3 is a schematic diagram of the on-board unit according to an embodiment of the present disclosure.

Referring to FIG. 3, in the embodiment, the on-board unit 10 includes at least a first subscriber identity module (hereinafter referred to as the first SIM) 11, a second subscriber identity module (hereinafter referred to as the second SIM) 12, a main processor 13, a modem 14, an RF switch module 15, an antenna module 16, and a microprocessor 17.

Figure 5:
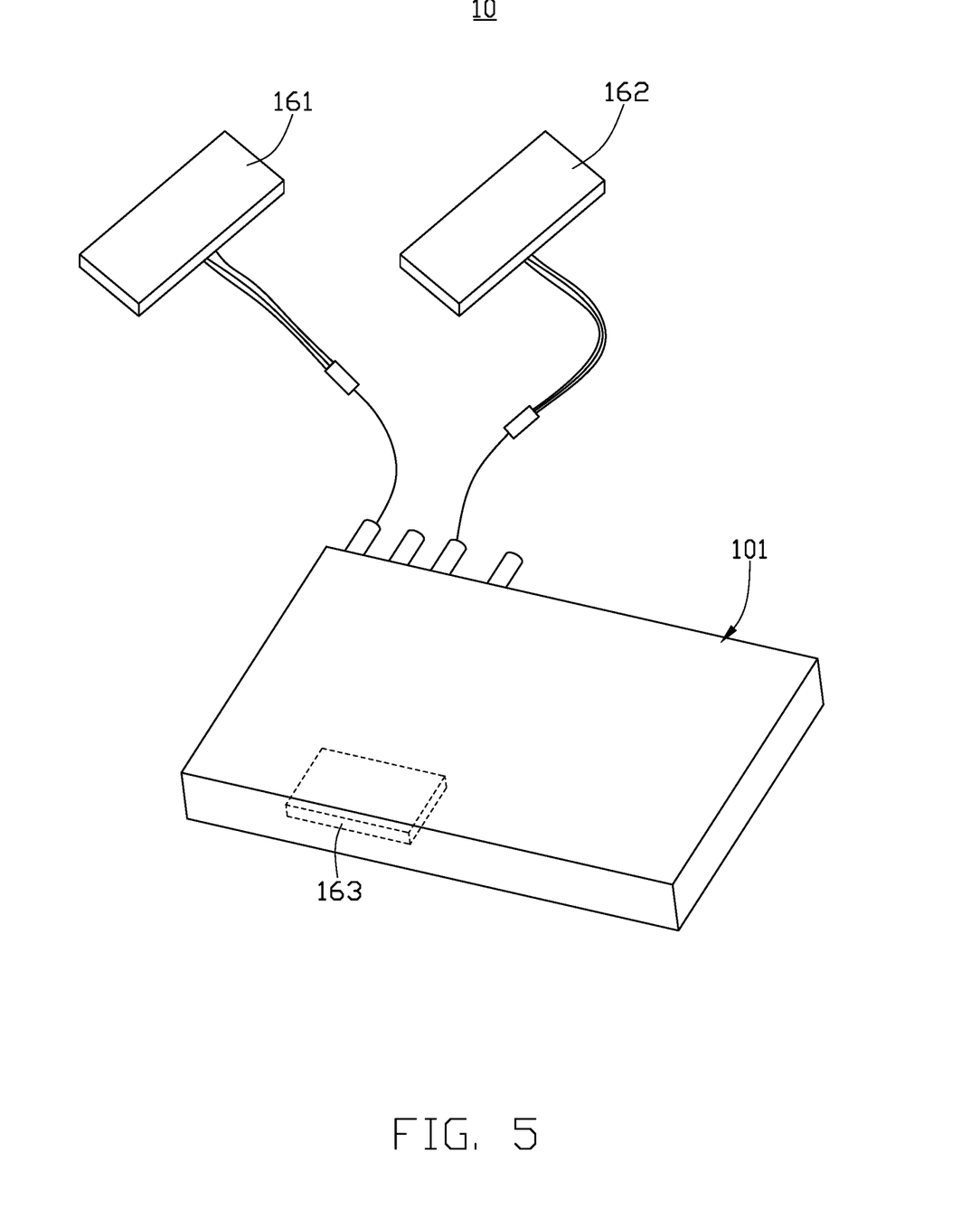
FIG. 5 is a schematic diagram of the on-board unit according to another embodiment of the present disclosure.

The RF switch module 15 includes a plurality of radio frequency switches, the antenna module 16 includes a plurality of antennas. In some embodiments, the on-board unit 10 also includes a storage device or a prompting module (such as LED light or voice module). The first SIM 11, the second SIM 12, the main processor 13, the modem 14, the RF switch module 15, the microprocessor 17, and the storage device can be integrated in the same housing 101 (shown in FIG. 5) to form the on-board unit 10. The antenna module 16 may be arranged in and/or outside the housing 101 of the on-board unit 10.

The on-board unit 10 can support a variety of radio access technologies (RAT). For example, the on-board unit 10 may be configured to use any of various RATS, such as the global system for mobile communications (GSM), the universal system for mobile communications (UMTS), code division multiple access (CDMA, such as cdma2000 1×RTT or other CDMA radio access technologies), long term evolution (LTE), advanced LTE (LTE-A), the fifth-generation mobile communication technology (5G) and/or two or more of other RATs. For example, the on-board unit 10 may support at least two radio access technologies, such as LTE and 5G. The on-board unit 10 may also support various or other RATs as desired.

In the embodiment, both the first SIM 11 and the second SIM 12 are electrically connected to the main processor 13, and the main processor 13 is electrically connected to the modem 14. SIM stores user information, encryption key, and other contents, which can be used by the network to identify the user and encrypt the voice information during the user's call. The on-board unit 10 can order network services from telecom operators through SIM (such as the first SIM 11 and the second SIM 12). For example, in the embodiment, the on-board unit 10 can order the first network connection service and the second network connection service from the telecom operator through the first SIM 11 and the second SIM 12, respectively.

The main processor 13 is used to manage the first SIM 11 and the second SIM 12 and process data to generate baseband digital signals. For example, in the embodiment, the main processor 13 can select the first SIM 11 and/or the second SIM 12 to make a call, so as to receive the uplink data packets related to the services of the first SIM 11 and/or the second SIM 12, process them into a baseband signal and output them to the modem 14.

In the embodiment, the first SIM 11 is configured to communicate via the first network, and the second SIM 12 is configured to communicate via the second network. The first network and the second network are provided by different telecom operators. Compared with the existing single card communication on-board unit, the on-board unit 10 can support network services of different telecom operators at the same time and obtain a wider network coverage, thus when one network has problems, the on-board unit 10 can also switch to other network in time to improve the call success rate, so as to have a greater chance to send a distress signal to the rescue center.

In another embodiment, the on-board unit 10 can also order the network services of the same telecom operator through the first SIM 11 and the second SIM 12.

In the embodiment, the modem 14 is also electrically connected to the RF switch module 15, the RF switch module 15 is electrically connected to the antenna module 16. After receiving the baseband signal output by the main processor 13, the modem 14 can modulate the baseband signal into an RF signal under the control of the main processor 13 and output the RF signal to the RF switch module 15 for outward transmission via the antenna module 16.

In the embodiment, the modem 14 supports Dual Sim Dual Active (DSDA) technology to realize the function of the on-board unit 10 using the first SIM 11 and the second SIM 12 to talk at the same time, so as to ensure the probability of success in an emergency call.

In the embodiment, the antenna module 16 can also receive the RF signal and transmit the RF signal to the modem 14 via the RF switch module 15, to demodulate the RF signal into the baseband signal and transmit the baseband signal to the main processor 13 to obtain the required information.

In the embodiment, the main processor 13 is also electrically connected to the microprocessor 17, the microprocessor 17 is also electrically connected to the RF switch module 15. The main processor 13 can control the RF switch module 15 to switch through the microprocessor 17 to establish an RF path. The microprocessor 17 is also electrically connected to each antenna in the antenna module 16. The main processor 13 can detect the working state of each antenna in the antenna module 16 through the microprocessor 17, so as to timely adjust the RF path and ensure that the on-board unit 10 can output a distress signal in time.

In one embodiment, the main processor 13 is electrically connected to the microprocessor 17 through a universal asynchronous receiver/transmitter (UART) to output the selection information of the first SIM 11 and the second SIM 12 to the microprocessor 17. The microprocessor 17 controls the RF switch module 15 to select the first SIM 11 and/or the second SIM 12 to form an RF path. For example, in the embodiment, the main processor 13 can separately select the first SIM 11 or the second SIM 12 to call. The main processor 13 can also select the first SIM 11 and the second SIM 12 to call at the same time. When the main processor 13 detects that one of the first SIM 11 and the second SIM 12 is abnormal, the main processor 13 can switch and select the other of the first SIM 11 and the second SIM 12 that is not abnormal to make a call.

Figure 4:
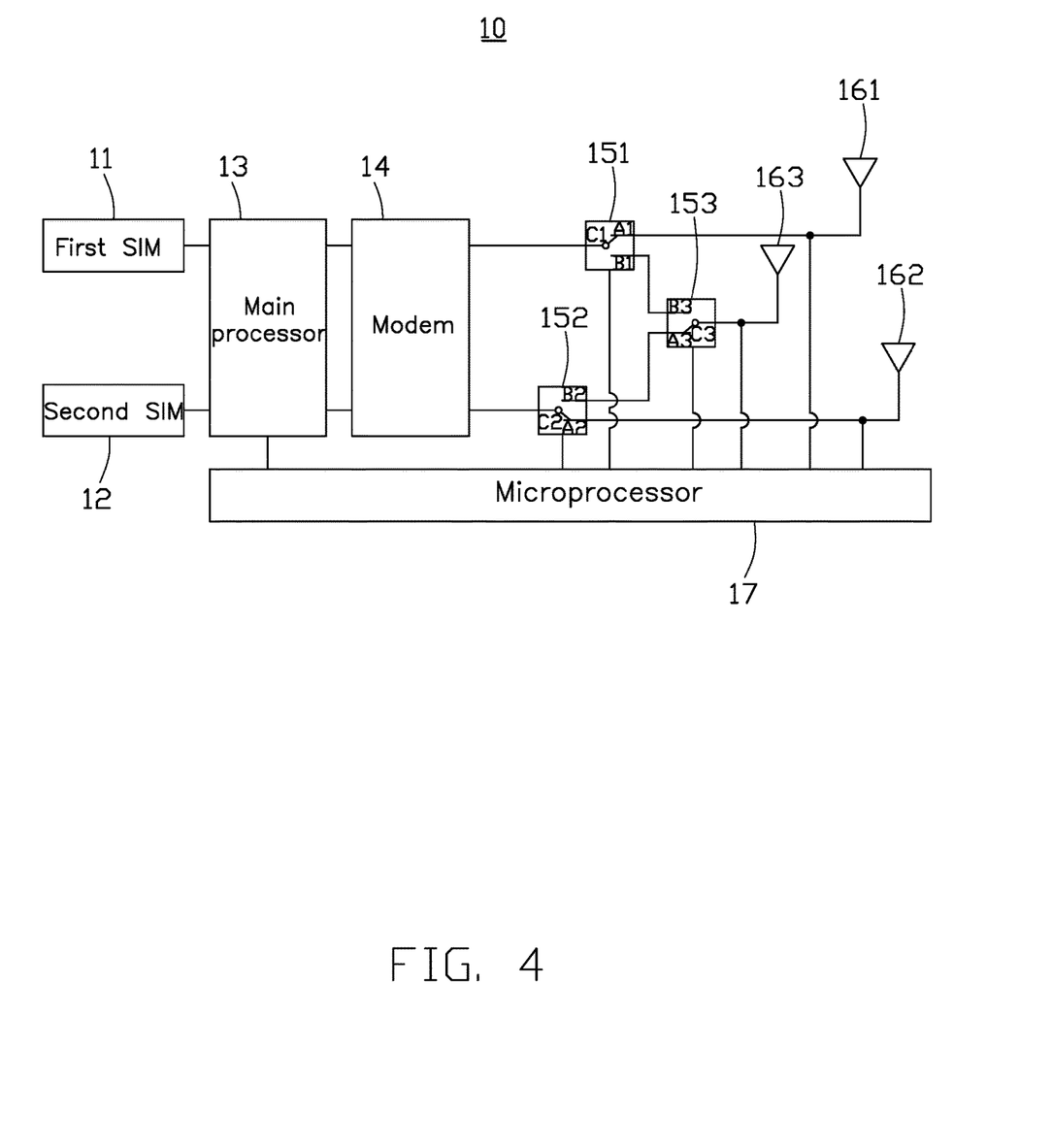
FIG. 4 is a circuit structure diagram of part of the on-board unit according to an embodiment of the present disclosure.

Referring to FIG. 4, in the embodiment, the RF switch module 15 includes a first RF switch 151, a second RF switch 152, and a third RF switch 153. The microprocessor 17 is electrically connected to the first RF switch 151, the second RF switch 152, and the third RF switch 153. The microprocessor 17 can control the switching between the first RF switch 151, the second RF switch 152, and the third RF switch 153 respectively according to the SIM (such as the first SIM 11 and the second SIM 12) as selected by the main processor 13, so as to form an RF path and output the RF signals to the antenna module 16.

In the embodiment, the first RF switch 151, the second RF switch 152, and the third RF switch 153 are (single pole double throw) SPDT switches. The first RF switch 151, the second RF switch 152, and the third RF switch 153 all include a moving end, a first fixed end, and a second fixed end. In some embodiments, under the control of the main processor 13, the microprocessor 17 can output high level or low level signal to the moving end of each RF switch (such as the first RF switch 151, the second RF switch 152, and the third RF switch 153), to control the RF switch to switch between the first fixed end and the second fixed end, so as to form different RF paths. In other embodiments, the first RF switch 151, the second RF switch 152, and the third RF switch 153 can also be switch tubes or other circuit modules or electronic devices to realize switching functions.

The antenna module 16 includes a first antenna 161, a second antenna 162, and a third antenna 163. The first antenna 161 and the second antenna 162 are external antennas, and the third antenna 163 is a built-in antenna. The first antenna 161 and the second antenna 162 are arranged outside the housing 101 of the on-board unit 10, and the third antenna 163 is arranged in the housing 101 of the on-board unit 10 (shown in FIG. 5). It can be understood that the third antenna 163 arranged in the on-board unit 10 is installed and arranged to be less likely to suffer damage in an accident. When the first antenna 161 and the second antenna 162 as external antennas are damaged, the third antenna 163 provides a spare antenna for the on-board unit 10.

In the embodiment, the main processor 13 also detects the working state of each antenna in the 16 through the microprocessor 17.

After the installation of the on-board unit 10, the impedance of the signal path when the antenna works normally is certain, and the current of the signal supplying power to the antenna is also maintained within a certain range. After inputting the power supply signal, if the corresponding antenna is in normal working state, it will detect that the current of the antenna is within a preset current range. If such antenna is in an abnormal state, such as antenna damage, short circuited, or open circuited, it will be detected that the current of the antenna is outside the preset range. In the embodiment, the microprocessor 17 can detect the current of the first antenna 161, the second antenna 162, and the third antenna 163 through the sensor to determine whether each of them is in a normal working state.

In some embodiments, the on-board unit 10 also includes a converting module (not shown), the converting module may convert the analog current signal of each antenna detected by the microprocessor 17 through the sensor (not shown) into a digital signal, to facilitate the microprocessor 17 in determining the state of each antenna (such as the first antenna 161, the second antenna 162, and the third antenna 163).

The microprocessor 17 also outputs the detection result to the main processor 13. When not all the antennas in the antenna module 16 are working normally, the main processor 13 controls the prompt module to output warning information to remind the user or garage or other to repair or replace the corresponding parts.

Therefore, under the control of the main processor 13, the microprocessor 17 controls the first RF switch 151, the second RF switch 152, and the third RF switch 153 to switch to the selected SIM depending on the detected antenna state, so as to ensure that the on-board unit 10 realizes an emergency call function.

In the embodiment, the moving end C1 of the first RF switch 151 is electrically connected to the modem 14, the first fixed end A1 of the first RF switch 151 is electrically connected to the first antenna 161, and the second fixed end B1 of the first RF switch 151 is electrically connected to the second fixed end B3 of the third RF switch 153. The moving end C2 of the second RF switch 152 is electrically connected to the modem 14, the first fixed end A2 of the second RF switch 152 is electrically connected to the second antenna 162, and the second fixed end B2 of the second RF switch 152 is electrically connected to the first fixed end A3 of the third RF switch 153. The moving end C3 of the third RF switch third RF switch 153 is electrically connected to the third antenna third antenna 163. The first RF switch 151 is used to transmit or receive the communication data of the first SIM, and the second RF switch 152 is used to transmit or receive the communication data of the second SIM.

When the main processor 13 detects that the first antenna 161 is in or remains in a normal state through the microprocessor 17, the main processor 13 can select the first SIM 11 to make a call. Therefore, under the control of the main processor 13, the microprocessor 17 can control the moving end C1 of the first RF switch 151 to be switched and connected to the first fixed end A1, so that the on-board unit 10 transmits or receives data through the first antenna 161. When the main processor 13 detects that the first antenna 161 is in a normal state through the microprocessor 17, the main processor 13 can select the first SIM 11 to make a call. Therefore, under the control of the main processor 13, the microprocessor 17 can control the moving end C1 of the first RF switch 151 to switch and connect to the second fixed end B1 and control the moving end C3 of the third RF switch 153 to switch and connect to the second fixed end B3, so that the on-board unit 10 transmits or receives data through the third antenna 163.

When the main processor 13 detects that the second antenna 162 is in a normal state through the microprocessor 17, the main processor 13 can select the second SIM 12 to make a call. Therefore, under the control of the main processor 13, the microprocessor 17 can control the moving end C2 of the second RF switch 152 to be switched and connected to the first fixed end A2, so that the on-board unit 10 transmits or receives data through the second antenna 162. When the main processor 13 detects that the third antenna 163 is in a normal state through the microprocessor 17, the main processor 13 can select the second SIM 12 to make a call. Therefore, under the control of the main processor 13, the microprocessor 17 can control the moving end C1 of the second RF switch 152 to switch and connect to the second fixed end B2 and control the moving end C3 of the third RF switch 153 to switch and connect to the first fixed end A3, so that the on-board unit 10 transmits or receives data through the third antenna 163, so that the on-board unit 10 transmits or receives data through the third antenna 163.

The movable device 100 is also provided with an airbag module 19 (shown in FIG. 3). The airbag module 19 is provided with a collision sensor 191 for sensing collision when the movable device 100 is impacted. The airbag module 19 automatically deploys after sensing the impact, so as to cushion the pressure on passengers during the impact and protect passengers. The airbag module 19 is also electrically connected to the microprocessor 17, so that the main processor 13 can sense the collision through the microprocessor 17 and the collision sensor 191 and trigger the emergency call function of the on-board unit 10 when the collision is sensed. The emergency call function refers to the on-board unit 10 automatically sending a distress signal to the rescue center 200.

In some embodiments, the on-board unit 10 is also provided with key (not shown), and the key is electrically connected to the main processor 13. In this way, the main processor 13 can trigger the emergency call function when detecting that a passenger touches the key.

On the one hand, the on-board unit 10 provided by the present disclosure sets the first SIM 11 and the second SIM 12 to obtain a wider network coverage and improve the call success rate of the on-board unit 10. On the other hand, by setting an external antenna (such as the first antenna 161 and the second antenna 162) and a built-in antenna (such as the third antenna 163), while reducing the volume of the on-board unit 10, a connection to a network can always be maintained even in case of damage to the external antenna.

The present disclosure does not limit the number of RF switches in the RF switch module 15 and the number of antennas in the antenna module 16, and the number of RF switches and the number of antennas may be same or different. For example, in other embodiments, the number of RF switches in the RF switch module 15 may be greater than or equal to 2. The number of antennas in the antenna module 16 may be greater than or equal to 2, and at least one antenna in the antenna module 16 is a built-in antenna. Those skilled in the art can adjust the number of RF switches in the RF switch module 15 and the number of antennas in the antenna module 16 according to the actual needs. Those skilled in the art can further adjust the connection relationship between the RF switch and the antenna according to the number of RF switches and antennas, so as to ensure that both the external antenna and the built-in antenna can send signals to the rescue center.

Figure 6:
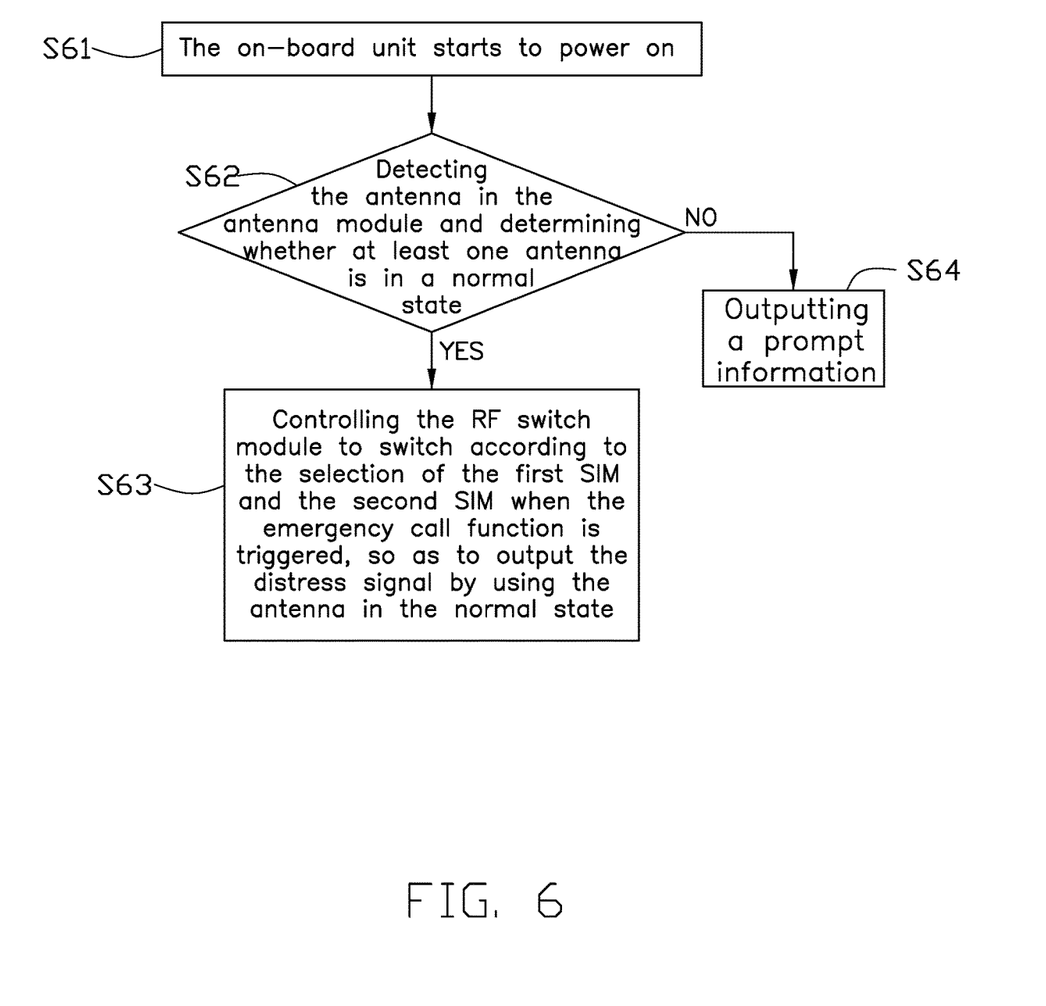
FIG. 6 is a flowchart of a control method according to an embodiment of the present disclosure.

FIG. 6 is a flowchart depicting an embodiment of a control method. The control method controls the operation of the on-board unit 10. The control method is executed by the main processor 13.

Each block shown in FIG. 6 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 61.

At block 61, the on-board unit is powered on.

At block 62, detecting the antenna in the antenna module 16 and determining whether at least one antenna is in a normal state. If the at least one antenna is in a normal state, block 63 is implemented, otherwise block 64 is implemented.

The main processor 13 can detect the status of several antennas in the antenna module 16 through the microprocessor 17. For the specific antenna detection principle and processes, refer to the detection of antenna module 16 by microprocessor 17 above, which will not be repeated here.

At block 63, controlling the RF switch module 15 to select the first SIM 11 and/or the second SIM 12 when the emergency call function is triggered, so as to output a distress signal by using the antenna in the normal state in the antenna module 16.

As shown in the following Table 1, in the first case (case1), when the main processor 13 detects that the first antenna 161 and the second antenna 162 are in a normal state through the microprocessor 17 and the emergency call function is triggered, the main processor 13 controls the first SIM 11 and the second SIM 12 to call through the first antenna 161 and the second antenna 162 respectively.

In the second case (case2), when the main processor 13 detects that the first antenna 161 and the third antenna 163 are in a normal state and the second antenna 162 is in an abnormal state, through the microprocessor 17, and the emergency call function is triggered, the main processor 13 controls the first SIM 11 to make a call through the first antenna 161, and the main processor 13 controls the second SIM 12 to make a call through the third antenna 163.

In the third case (case3), when the main processor 13 detects that the second antenna 162 and the third antenna 163 are in a normal state and the first antenna 161 is in an abnormal state, through the microprocessor 17, and the emergency call function is triggered, the main processor 13 controls the first SIM 11 to make a call through the third antenna 163, and the main processor 13 controls the second SIM 12 to make a call through the second antenna 162.

In the fourth case (case4) and the fifth case (case5), when the main processor 13 detects that the first antenna 161 and the second antenna 162 are in an abnormal state and the third antenna 163 is in a normal state through the microprocessor 17, and the emergency call function is triggered, the main processor 13 controls the first SIM 11 to make a call through the third antenna 163 (refer to case4), or the main processor 13 controls the second SIM 12 to make a call through the third antenna 163 (refer to case5).

Even if any of the first antenna 161, the second antenna 162, and the third antenna 163 are not working normally, the DCDP mode of the on-board unit 10 can be maintained to improve the call success rate of the on-board unit 10. In addition, in the on-board unit 10, even if only one of the first antenna 161, the second antenna 162, and the third antenna 163 can be used normally, the first SIM 11 or the second SIM 12 in the on-board unit 10 can be guaranteed to make a call, so as to comprehensively ensure the normal operation of the E-call system of the on-board unit 10.

The DCDP mode means that the same on-board unit 10 can call through two SIMs (such as the first SIM 11 and the second SIM 12) at the same time and can access signals at the same time. Thus, the on-board unit 10 can effectively improve the call success rate by setting the first SIM 11 and the second SIM 12.

TABLE 1 logic control truth table (0->A, 1->B, X-> arbitrarily)

| | Third RF switch | First RF switch | Second RF switch | remarks |
|---|---|---|---|---|
| case1 | X | 0 | 0 | The first antenna 161 and the second antenna 162 are normal; The first SIM 11 & the second SIM 12 can be called at the same time |
| case2 | 0 | 0 | 1 | The first antenna 161 is normal, the second antenna 162 is abnormal, and the third antenna 163 is normal; The first SIM 11 & the second SIM 12 can be called at the same time |
| case3 | 1 | 1 | 0 | The first antenna 161 is abnormal, the second antenna 162 is normal, and the third antenna 163 is normal; The first SIM 11 & the second SIM 12 can be called at the same time |
| case4 | 1 | 1 | X | The first antenna 161 and the second antenna 162 are abnormal, and the third antenna 163 is normal; The first SIM 11 can be called |

TABLE 1-continued logic control truth table (0->A, 1->B, X-> arbitrarily)

| | Third RF switch | First RF switch | Second RF switch | remarks |
|---|---|---|---|---|
| case5 | 0 | X | 1 | The first antenna 161 and the second antenna 162 are abnormal, and the third antenna 163 is normal; The second SIM 12 can be called |

At block 64, outputting a prompt information.

When all antennas in the antenna module 16 are in an abnormal state, the prompt information can be output.

In the embodiment, when the main processor 13 detects that at least one of the first antenna 161, the second antenna 162, and the third antenna 163 is abnormal through the microprocessor 17, the main processor 13 controls the prompting module to repeatedly or constantly output the prompt information to warn passengers or any other viewer to repair the on-board unit 10.

In some embodiments, the on-board unit 10 is also provided with a positioning module 18 (shown in FIG. 3). The positioning module 18 is used to obtain the current longitude and latitude data and other position information of the movable device 100. The positioning module 18 is electrically connected to the main processor 13. When the emergency call function of the on-board unit 10 is triggered, the main processor 13 also obtains the location information from the positioning module 18, integrates the rescue related data such as the accident time, the license plate number of the distressed vehicle, and the number of passengers, packs them into a minimum data set, and processes them into a radio frequency signal containing the above minimum data set through the modem 14 to transmit the rescue information to the rescue center 200.

The positioning module 18 may be a positioning module based on global positioning system (GPS), Beidou Positioning System or any other satellite positioning system.

In some embodiments, the rescue center 200 may be some central base rescue station. In other embodiments, the rescue center 200 may also be a specific contact, the present disclosure does not limit the type of the rescue center 200.

In this embodiment, the main processor 13 can be a baseband microprocessor, a central processing unit (CPU), other general-purpose microprocessors, digital signal processor (DSP), application specific integrated circuit (ASIC) off the shelf programmable gate array (FPGA) or other programmable logic devices, discrete gate or transistor logic devices, or discrete hardware components. It can be understood that the main processor 13 is the control center of the on-board unit 10, and uses various interfaces and lines to connect various parts of the whole on-board unit 10.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. An on-board unit configured for communication with a rescue center, and comprising a first subscriber identity module (SIM), a second SIM, a main processor, a microprocessor, a modem, a radio frequency (RF) switch module, and an antenna module, wherein each of the first SIM and the second SIM is electrically connected to the main processor;

the main processor is electrically connected to the modem;
the microprocessor is electrically connected to the main processor;
the RF switch module comprises a plurality of RF switches, and the microprocessor is electrically connected to each of the plurality of RF switches to control switching connection of each RF switch under the control of the main processor;
the modem is electrically connected to each of the RF switch module and the antenna module; and the main processor selects one of the first SIM and the second SIM to make a call, generates a corresponding baseband signal, and outputs the baseband signal to the modem, wherein the modem converts the baseband signal into a RF signal, and outputs the RF signal to the RF switch module to transmit outward via the antenna module.

2. The on-board unit of claim 1, wherein the antenna module comprises a plurality of antennas, and the microprocessor is also electrically connected to each of the plurality of antennas to detect whether each of the plurality of antenna is in a normal state.

3. The on-board unit of claim 2, wherein the on-board unit further comprises a housing, at least one antenna of the antenna modules is arranged in the housing.

4. The on-board unit of claim 2, wherein the antennas comprises a first antenna, a second antenna and a third antenna, and the RF switches comprises a first RF switch, a second RF switch and a third RF switch; a moving end of the first RF switch is electrically connected to the modem, a first fixed end of the first RF switch is electrically connected to the first antenna, a second fixed end of the first RF switch is electrically connected to a second fixed end of the third RF switch, a moving end of the second RF switch is electrically connected to the modem, a first fixed end of the second RF switch is electrically connected to the second antenna, a second fixed end of the second RF switch is electrically connected to a first fixed end of the third RF switch, and a moving end of the third RF switch is electrically connected to the third antenna; and wherein the first RF switch is configured to transmit or receive communication data of the first SIM, the second RF switch is configured to transmit or receive communication data of the second SIM, and the microprocessor is configured to control the moving end of corresponding RF switch to switch between the first fixed end and the second fixed end.

5. The on-board unit of claim 1, wherein the modem supports dual card dual pass technology.

6. The on-board unit of claim 1, wherein when the main processor detects that one of the first SIM and the second SIM is abnormal, the main processor selects another one of the first SIM and the second SIM without abnormality to make a call.

7. The on-board unit of claim 1, wherein the on-board unit further comprises an airbag module, the airbag module is electrically connected to the microprocessor, the airbag module comprises a collision sensor, when the main processor senses a collision through the microprocessor and the collision sensor, the main processor triggers an emergency call function to automatically send a distress signal.

8. A movable device comprising an on-board unit, and the on-board unit comprising a first subscriber identity module (SIM), a second SIM, a main processor, a microprocessor, a modem, a radio frequency (RF) switch module and an antenna module, wherein each of the first SIM and the second SIM is electrically connected to the main processor;

the main processor is electrically connected to the modem;

the microprocessor is electrically connected to the main processor;

the RF switch module comprises a plurality of RF switches, and the microprocessor is electrically connected to each of the plurality of RF switches to control switching connection of each RF switch under the control of the main processor;

the modem is electrically connected to each of the RF switch module and the antenna module; and the main processor selects one of the first SIM and the second SIM to make a call, generates a corresponding baseband signal, and outputs the baseband signal to the modem, wherein the modem converts the baseband signal into a RF signal, and outputs the RF signal to the RF switch module to transmit outward via the antenna module.

9. The movable device of claim 8, wherein the antenna module comprises a plurality of antennas, and the microprocessor is also electrically connected to each of the plurality of antennas to detect whether each of the plurality of antennas is in a normal state.

10. The movable device of claim 9, wherein the on-board unit further comprises a housing, at least one antenna of the antenna modules is arranged in the housing.

11. The movable device of claim 9, wherein the antennas comprises a first antenna, a second antenna and a third antenna, and the RF switches comprises a first RF switch, a second RF switch and a third RF switch; a moving end of the first RF switch is electrically connected to the modem, a first fixed end of the first RF switch is electrically connected to the first antenna, a second fixed end of the first RF switch is electrically connected to a second fixed end of the third RF switch, a moving end of the second RF switch is electrically connected to the modem, a first fixed end of the second RF switch is electrically connected to the second antenna, a second fixed end of the second RF switch is electrically connected to a first fixed end of the third RF switch, and a moving end of the third RF switch is electrically connected to the third antenna; and wherein the first RF switch is configured to transmit or receive communication data of the first SIM, the second RF switch is configured to transmit or receive communication data of the second SIM, and the microprocessor is configured to control the moving end of corresponding RF switch to switch between the first fixed end and the second fixed end.

12. The movable device of claim 8, wherein the modem supports dual card dual pass technology.

13. The movable device of claim 8, wherein when the main processor detects that one of the first SIM and the second SIM is abnormal, the main processor selects another one of the first SIM and the second SIM without abnormality to make a call.

14. The movable device of claim 8, wherein the on-board unit further comprises an airbag module, the airbag module is electrically connected to the microprocessor, the airbag module comprises a collision sensor, when the main processor senses a collision through the microprocessor and the collision sensor, the main processor triggers an emergency call function to automatically send a distress signal.

15. A control method comprising:

detecting whether at least one antenna in an antenna module is in a normal state; and controlling a radio frequency (RF) switch module to switch according to selection of a first subscriber identity module (SIM) and a second SIM when emergency call function is triggered, so as to output a distress signal by using the antenna module in the normal state, wherein when the antenna module comprises a first antenna, a second antenna and a third antenna, the controlling a radio frequency (RF) switch module to switch according to selection of a first subscriber identity module (SIM) and a second SIM when emergency call function is triggered, so as to output a distress signal by using the antenna in the normal state by:

controlling the first SIM and the second SIM to call through the first antenna and the second antenna respectively when the first antenna and the second antenna are in a normal state and the emergency call function is triggered; and controlling the first SIM to call through the first antenna and controlling the second SIM to call through the third antenna when the first antenna and the third antenna are in the normal state, the second antenna is in an abnormal state and the emergency call function is triggered.

16. The control method of claim 15, further comprising: controlling the first SIM to call through the third antenna or controlling the second SIM to call through the second antenna when the second antenna and the third antenna are in the abnormal state, the first antenna is in the normal state and the emergency call function is triggered.

17. The control method of claim 16, further comprising: controlling the first SIM to call through the third antenna or controlling the second SIM to call through the third antenna when the first antenna and the second antenna are in the abnormal state, the third antenna is in the normal state and the emergency call function is triggered.

* * * * *